United States Patent [19]
Lazaratos

[11] Patent Number: 6,014,342
[45] Date of Patent: Jan. 11, 2000

[54] METHOD OF EVALUATING A SUBSURFACE REGION USING GATHER SENSITIVE DATA DISCRIMINATION

[75] Inventor: Spyridon K. Lazaratos, Houston, Tex.

[73] Assignee: TomoSeis, Inc., Houston, Tex.

[21] Appl. No.: 08/893,334

[22] Filed: Jul. 16, 1997

Related U.S. Application Data

[63] Continuation-in-part of application No. 08/820,855, Mar. 20, 1997.

[51] Int. Cl.$^7$ ........................................................ G01V 1/34
[52] U.S. Cl. ................................. 367/38; 367/47; 367/75
[58] Field of Search ................................ 367/73, 38, 47, 367/50, 59, 68, 74, 90, 70, 75, 421

[56] References Cited

U.S. PATENT DOCUMENTS

| | | | |
|---|---|---|---|
| 4,646,239 | 2/1987 | Bodine et al. | 367/38 |
| 4,677,597 | 6/1987 | Wright | 367/47 |
| 4,964,102 | 10/1990 | Kelly et al. | 367/73 |
| 5,740,125 | 4/1998 | Chon et al. | 367/75 |

OTHER PUBLICATIONS

Spyridon K. Lazaratos and Bruce P. Marion; "Crosswell seismic imaging of reservoir changes caused by $CO_2$ injection"; Nov. 1996; Expanded abstracts of annual international meeting of the society of exploration geophysicists.

Jerry M. Harris; "Lattice Parameterization for Tomography"; May 1993; Annual report of seismic tomography project, department of geophysics, Stanford University.

Jerry M. Harris; "An approach to adaptive gridding for traveltime tomography"; Jun. 1994; Annual report of seismic tomography project, department of geophysics, Stanford University.

Ozdogan Yilmaz, Seismic Data Processing, 1987, McGraw Hill Book Co.

James W. Rector III, et al; "High–resolution crosswell imaging of a west Texas carbonate reservoir: Part 3—Wavefield separation of reflections"; May–Jun. 1995; Geophysics, vol. 60, No. 3.

James W. Rector III, et al; "Multidomain analysis and wavefield separation of cross–well seismic data", Jan. 1994; Geophysics, vol. 59, No. 1.

Ashraf A. Khalil, et al; "Full–waveform processing and interpretation of kilohertz cross–well seismic data"; Sep. 1993; Geophysics, vol. 58, No. 9.

(List continued on next page.)

*Primary Examiner*—Christine K. Oda
*Assistant Examiner*—Anthony Jolly
*Attorney, Agent, or Firm*—Mike Pritzkao; Steve Shear

[57] ABSTRACT

A method of evaluating a subsurface region by separating/enhancing a certain type of seismic event data of interest from an overall set of seismic event data which includes other, different types of seismic event data is disclosed herein. In accordance with one feature, a particular type of gather is generated from the seismic event data such that the gather includes at least a portion of the data which is of interest and at least a portion of the other data. A series of data discrimination lines are incorporated into the gather at positions and directions which are established in the gather in a predetermined way. Using the data discrimination lines, the data of interest which is present in the gather is separated/enhanced with respect to the other data within the gather. The separated data may be used for example in producing a map of the particular subterranean region. In accordance with another feature, the gather is selected such that the incorporated discrimination lines approach a near parallel relationship with one another. Thereby, the data is transformed in a way which causes the discrimination lines to be parallel with one another, resulting in reduced frequency distortion accompanied by improved accuracy in the separation/enhancement of data. In accordance with still another feature, the disclosed data separation/enhancement method is compatible with an iterative approach.

30 Claims, 7 Drawing Sheets

OTHER PUBLICATIONS

Spyros K. Lazaratos, et al; "High–resolution, cross–well reflection imaging: Potential and technical difficulties"; Sep. 1993; Geophysics, vol. 58, No. 9.

Peter S. Rowbotham and Neil R. Goulty; "Wavefield separation by 3–D filtering in crosshole seismic reflection processing"; Jul. 1994; Geophysics vol. 59, No. 7.

Mark Van Schaack, et al; "High–resolution crosswell imaging of a west Texas carbonate reservoir: Part 2—Wavefield modeling and analysis"; May–Jun. 1995; Geophysics vol. 60, No. 3.

METHOD OF EVALUATING A SUBSURFACE REGION USING GATHER SENSITIVE DATA DISCRIMINATION

CROSS-REFERENCE TO RELATED APPLICATION

The present application is a continuation-in-part of U.S. patent application Ser. No. 08/820,855, entitled "HIGH VERTICAL RESOLUTION CROSSWELL SEISMIC IMAGING", filed Mar. 20, 1997, which is incorporated herein by this reference.

BACKGROUND OF THE INVENTION

The present invention relates generally to data discrimination in applications such as, for example, seismic imaging and more particularly to a method for separating a particular sub-set of seismic data from an overall set of seismic data by utilizing a gather sensitive data discrimination approach in order to evaluate a particular subsurface seismic region.

In fields such as geophysics and geology, knowledge of the subsurface structure of the ground is useful, for example, in the selection of potential well sites and in fault studies. In the past, a number of different methods have been implemented with the goal of rendering images which impart such knowledge of the subsurface geologic structure. As will be seen, the accuracy of results obtained using these methods is dependent upon specific processing techniques for separating/enhancing seismic data of a selected type from an overall set of seismic data. One exemplary method, which benefits from the advantages of the present invention, is commonly referred to as crosswell imaging (also known as transmission tomography) and will be described immediately hereinafter.

Turning immediately to FIG. 1, crosswell imaging is typically performed using a crosswell imaging system which is generally indicated by the reference numeral 10. In system 10, seismic energy 12 is transmitted through a subsurface region 14 of the ground using a source 16 which is positioned in a first borehole 18. In state of the art systems, source 16 typically transmits seismic energy 12 into region 14 in the form of a swept frequency signal (chirp) which covers a predetermined frequency range resulting in transmitted energy in the form of compressional (p) and shear (s) waves. Source 16 is selectively movable between a series of positions $S_1$ through $S_N$ using a winch and cable arrangement 20 wherein source 16 is shown initially at $S_1$, adjacent the surface of region 14, and is shown in phantom at $S_N$, adjacent the bottom of borehole 18. In order to properly couple source 16 with the subsurface surrounding first borehole 18, source 16 is typically immersed in a liquid or mud (neither of which is shown) which is either present or introduced into borehole 18. It should be noted that the subsurface structure of the ground being imaged is not illustrated in the present figure for purposes of clarity.

Still referring to FIG. 1, seismic energy 12 passes through region 14 and is received by a receiver array 22 which is positioned within a second borehole 24 at a distance w from the first borehole. Like source 16, receiver array 22 is normally immersed in some medium (not shown) for coupling the receiver to subterranean region 14 and, further, is selectively movable between positions $R_1$ through $R_S$ using a winch and cable arrangement 26 wherein receiver array 22 is initially shown at $R_1$, adjacent the surface of region 14 and is shown in phantom at $R_S$, adjacent the bottom of borehole 24. It should be appreciated that the subterranean region of interest may comprise a zone (not shown for purposes of simplicity) which is at a known depth below the surface. In this case, the source and receiver array positions are adjusted accordingly such that the positions are spaced across the zone of interest rather than extending all the way to the surface. Receiver array 22 is made up of any suitable number of receivers such as, for example, five receivers 22a–e to record seismic energy 12 at five vertically spaced positions which are, of course, locationally dependent upon the overall position (one of $R_1$ through $R_S$) of the receiver array. It is noted that the first and second boreholes are illustrated as being perfectly vertically oriented for purposes of simplicity. Deviation of these boreholes from the perpendicular direction is typically referred to as well or borehole deviation. Inasmuch as borehole deviation is a concern, the reader is referred to the above referenced U.S. patent application which discloses a highly advantageous technique for use in borehole deviation correction.

During the operation of imaging system 10, a series of source scans is performed in each of which source 16 transmits seismic signal 12 in sequence from positions $S_1$ through $S_N$ with receiver array 22 located at one of the positions selected from $R_1$ through $R_S$. In one method for completing the source scans, receiver array 22 is initially located at $R_1$ during a first source scan. This first source scan begins with source 16 transmitting from $S_1$ such that seismic signal 12 propagates through region 14 and is received at $R_1$, as illustrated by raypaths 28a–e (partially shown) which are associated with each of receivers 22a–e. Raypaths are commonly used in the art as an expedient in describing the propagation of a wavefront through some medium wherein the raypath representation is perpendicular to the actual wavefront at any particular point therealong. For purposes of simplicity, raypaths 28 are shown as being straight. However, it is recognized that specific subsurface structural features such as, for example, stratifications, often result in raypaths which are not straight (i.e., directly from a source position to a receiver position) and that energy propagated along any of these raypaths is readily detected by receiver array 22. It is further recognized with regard to raypaths that seismic energy propagates along each raypath, as defined between source 16 and a respective receiver (one of 22a–e), at some average velocity which is dependent upon the structural features and velocity characteristics of the materials that are encountered along the overall length of the raypath. This average velocity is normally considered in terms of a "traveltime" which is associated with each raypath. Traveltimes are categorized in terms of particular characteristics of their associated seismic wave types. In the particular instance of seismic waves that travel from source to receiver without being reflected or converted to another wave type, traveltimes are referred to as direct arrival as contrasted with, for example, reflected (non-direct) arrival. One of skill in the art will recognize that a number of prior art techniques exist for separating direct arrival traveltime data, reflected arrival traveltime data and other known types of traveltime data from the overall seismic data record. However, it is submitted that each of these techniques is disadvantageous in certain respects, as will be described in further detail at appropriate points below.

Continuing to refer to FIG. 1 and as the scanning operation continues, source 16 is moved/scanned in the direction indicated by an arrow 27 to successive source positions up to and including $S_N$ such that data is recorded for each of positions $S_1$ through $S_N$ with the receiver array located at $R_1$. Next, receiver array 22 is moved in the direction indicated by an arrow 29 to position $R_2$ (not shown) and source 16 is returned to position $S_1$ at which time the source scan is repeated in the aforedescribed manner wherein seismic signal 12 is transmitted from each of positions $S_1$ through $S_N$ so as to complete a second source scan corresponding to receiver position $R_2$. The inception of the final source scan (performed with receiver array 22, shown in phantom, at Rs) is illustrated wherein source 16 initially transmits from $S_1$ to $R_S$. A final source scan is completed with the source/receiver positions Sn-Rn. It is noted that this operation may be performed in any number of different ways so long as measurements are obtained between each receiver position (within the overall receiver array) and each source position so as to produce a seismic data record which is representative of region 14.

The seismic data record, in and by itself, represents a relatively complex, rather large body of information which includes no less than six distinct categories of data (i.e., wave type arrivals) for a source which emits both p (compressional) and s (shear) waves. These wave types include direct arrival p (generally the first to be seen at the receiver); direct arrival s; reflected arrival p (hereinafter p—p); reflected arrival s (hereinafter s—s); p to s (hereinafter p–s) converted and reflected waves; and s to p (hereinafter s–p) converted and reflected. For purposes of brevity, many of these categories will not be described further. However, it is noted that all of these wave types and more are present in typical seismic data records even in the simplest of geologic settings, resulting in a seismic data record rich in overlapping (i.e., superimposed) arrival events. As will be seen immediately hereinafter, the prior art provides a limited number of effective techniques for separating these data types from the overall seismic data record.

Turning now to FIG. 2, one particular technique for graphically illustrating a portion of a seismic data record is referred to as a "gather" and is generally indicated by the reference numeral 40. A plurality 42 of horizontally extending seismic pressure wave traces or receiver channel traces are plotted in gather 40 in a manner which is well known in the art. The traces which make up gather 40 are selected from the overall seismic data record in a way which determines gather 40 as being one of a number of particular types. In the present example, gather 40 is known in the art as a common receiver gather. That is, all of the traces which make up the gather are measured from a single receiver position while the source position varies in depth. For example, source/receiver positions in a common receiver gather might include $S_1/R_1$, $S_2/R_1$ and $S_3/R_1$, among many others. A vertically extending depth axis 44 indicates source depth which can readily be correlated with any of the traces. Gather 40 further includes a horizontally extending time axis 46 which indicates traveltimes along its length in milliseconds. As will be seen hereinafter, various techniques may be used in conjunction with gather 40 for use in the identification of specific types of arrival data whereby the identified data may be eliminated or included in a particular processing procedure.

Still referring to FIG. 2, one relatively straightforward technique relates to identification of direct arrival data (both p and s types). As described previously, p type direct arrival data is normally first to arrive at the receiver. Thus, an initial event parallel to a line 48 is made up of this type of data. Additionally, data which is generally parallel to the initial wave front is identifiable as p or s direct arrival. For example, events indicated at 50 and 52 are identified as such generally parallel events. At lines 58 and 60, s type direct arrivals are identifiable. In a manner which is similar to the direct arrival p type events, events such as those at lines 62 and 64, which are generally parallel with the s type direct arrivals (line 56), are identified.

Another, more complex, technique is particularly useful in identifying p—p reflection data through the process of elimination. This technique identifies data which cannot be p—p reflection data based upon a particular, known characteristic of the p—p reflection data which is present in common receiver gather 40. More specifically, it is known in the art that, for horizontal reflection horizons (i.e., structures or boundaries) which lie below a line (not shown) drawn between a particular source position and a particular receiver position, events/data within gather 40 associated with that horizon will have a positive slope. Therefore, it is recognized that events having a negative slope in gather 40 such as, for example, the event which lies along a line 66 cannot be p—p reflection data. With regard to this process of elimination technique as well as the previously described technique, it should be appreciated that a number of different common receiver gathers can be produced using one set of seismic imaging data. By way of example, for a typical seismic data record using two hundred different receiver positions, two hundred different common receiver gathers of varying usefulness can be generated. Each of these gathers may be subjected to the technique presently under discussion since each gather may contain different reflection events. Moreover, once this technique has been applied to all of the common receiver gathers, its results can be enhanced by applying it in a similar manner to another set or family of gathers which are known in the art as common source gathers (not shown). Each common source gather includes traces for a number of different receiver positions having one common source position. Thus, for a seismic data record taken using two hundred different source positions, two hundred common source gathers are separable from the overall record. The technique presently under discussion is equally applicable for use with such common source gathers. It is also mentioned that both the common source and common receiver gathers also contain valid reflection data events having a negative slope for reflection horizons (not shown) which lie above a line drawn between source/receiver pairs. With minor modification, the aforedescribed procedure may be used in this instance to eliminate as possible reflection data that data having a positive slope. One of skill in the art will recognize that a process of elimination technique such as this is most powerful in combination with other, positive identification processes in an overall procedure for identifying bona fide reflection data. One such process will be described immediately hereinafter.

Referring to FIGS. 1 and 2, another technique in the prior art identifies reflection data in a positive way as opposed to using the process of elimination. Basically, this technique relies on Snell's law in conjunction with the seismic velocity in an area immediately around either the source or receiver at the ends of a particular raypath depending upon the specific type of gather being used. In a simplified example which assumes a constant velocity along an exemplary ray path 70 (FIG. 1) which includes a single reflection at a horizontal surface 72, the angle of incidence $\theta_1$ is equal to the angle of reflection $\theta_R$. For the common receiver gather of FIG. 2, the slope of a p—p single/primary reflection event such as, for example, the event along a line 74 (hereinafter event 74) in the gather is controlled by the angle of incidence $\beta 1$ (FIG. 1) of ray 70 at the source end of the ray. In this instance, $\beta 1 = \theta_1 = \theta_R$ since velocity is constant. It is noted that $\beta 1$ does not satisfy this equality in the case where the velocity is not constant along ray 70. However, $\beta 1$ continues to control the slope of the event in gather 40. For a common source gather (not shown), the slope of event 74, assuming constant velocity, is equal to the slope of the event in common receiver gather 40. In the case of non-constant velocity along ray 70, however, the angle of incidence β2 at the receiver controls the slope of event 74 in a common source gather. Thus, the criteria is established that, for constant velocity media, p—p primary events can be identified as having the same slope in a source gather as in a corresponding receiver gather.

It is to be understood that the prior art techniques described above are intended as being exemplary of more notable prior art approaches to the problem of identifying specific seismic data types and that these approaches are not intended to encompass all of the various techniques which have been applied to the problem. As an additional note, it should be mentioned that all of the foregoing techniques are typically automated in a high speed data processing environment simply due to the relatively enormous amount of data which is present in a typical seismic data record. These techniques have been graphically illustrated only for purposes of enhancing the reader's understanding.

Having described a number of approaches to the problem of identifying/separating seismic data from the overall seismic data record, it should be appreciated that these approaches and associated techniques have proven to be of some value. However, it is submitted that these prior art techniques, as well as other techniques which have not been described for purposes of brevity, share two weaknesses. First, these techniques have a tendency to reject data which is valid and, second, they share a tendency to fail to exclude data from a selected type which, in fact, should be excluded. Either of these weaknesses, even if present to a quite limited extent, can significantly and adversely affect the end result which is obtained in the application of the data, for example, in generating a reflection image. Thus, there continues to be a need for still more effective techniques for the identification/separation of specific types of data from the overall seismic data record in order to enhance seismic imaging and related applications.

The present invention provides a highly effective, heretofore unseen approach for resolving the problems encountered in the prior art in the identification of specific types of data contained by the seismic data record or similar such data sets.

SUMMARY OF THE INVENTION

As will be described in more detail hereinafter, a method of evaluating a subsurface region by separating/enhancing a certain type of seismic event data of interest with respect to an overall set of seismic event data which includes other, different types of seismic event data is disclosed herein. This method, like the method of the prior art, uses seismic data recorded for a particular subterranean region. However, in accordance with one feature of the present invention, a particular type of gather is generated from the seismic data such that the gather includes at least a portion of the certain seismic event data which is of interest and at least a portion of the other data. A series of data discrimination lines are incorporated into the gather at positions and directions which are established in the gather in a predetermined way. Using the data discrimination lines, the data of interest which is present in the gather is separated/enhanced with respect to the other data within the gather. The separated data may be used, for example, in producing a map of the particular subterranean region.

In accordance with another feature of the present invention, the gather is selected such that the incorporated discrimination lines approach a near parallel relationship with one another such that transforming the data in a way which causes the discrimination lines to be parallel with one another results in an acceptably low level of frequency distortion accompanied by improved accuracy in the separation/enhancement of data.

In accordance with one aspect of the present invention, the data separation/enhancement method of the present invention is compatible with an iterative approach.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
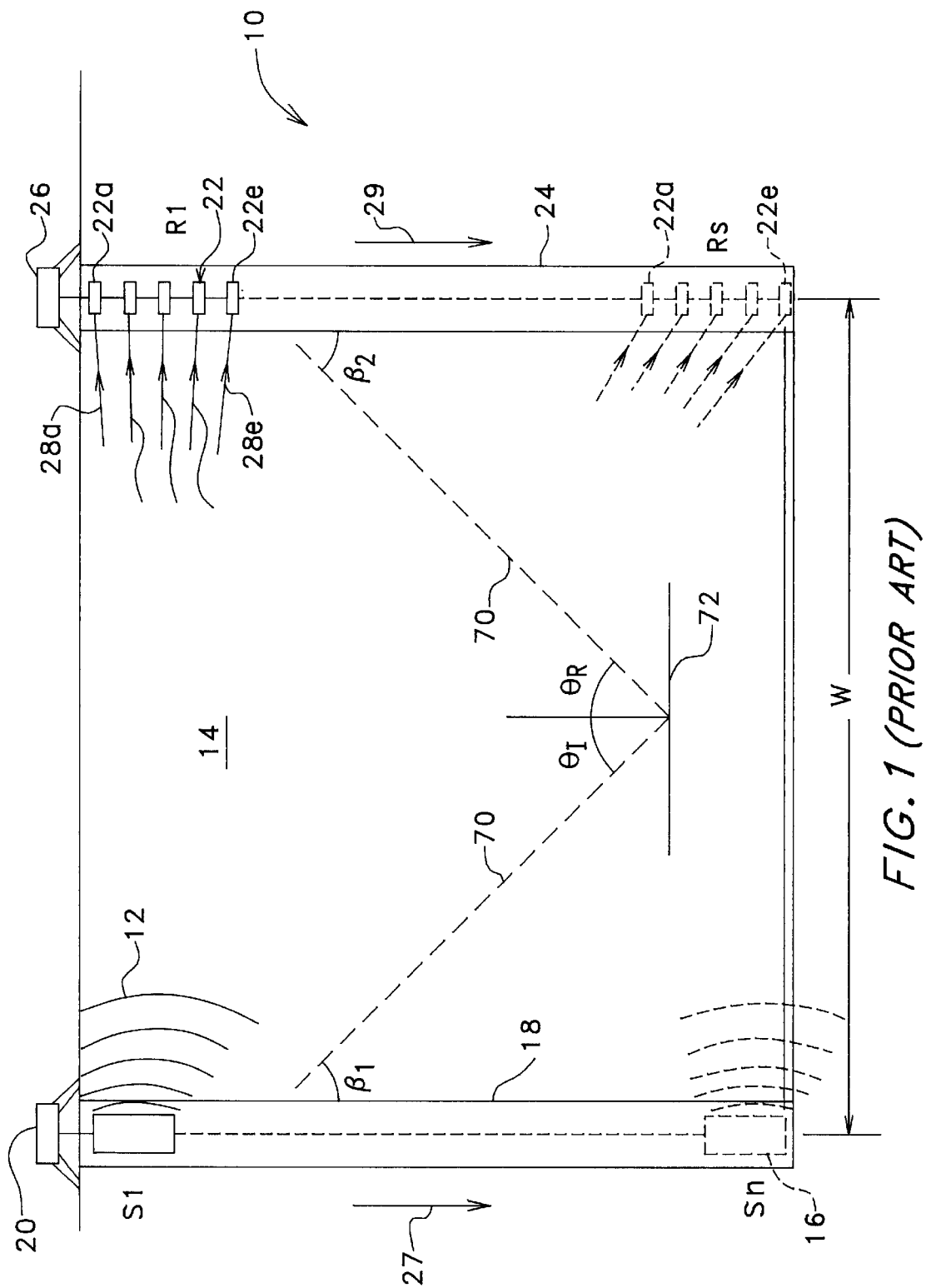
FIG. 1 is a diagrammatic cross-sectional view, in elevation, of a subterranean region extending between two boreholes and illustrating a prior art method of generating a set of seismic data.
Figure 2:
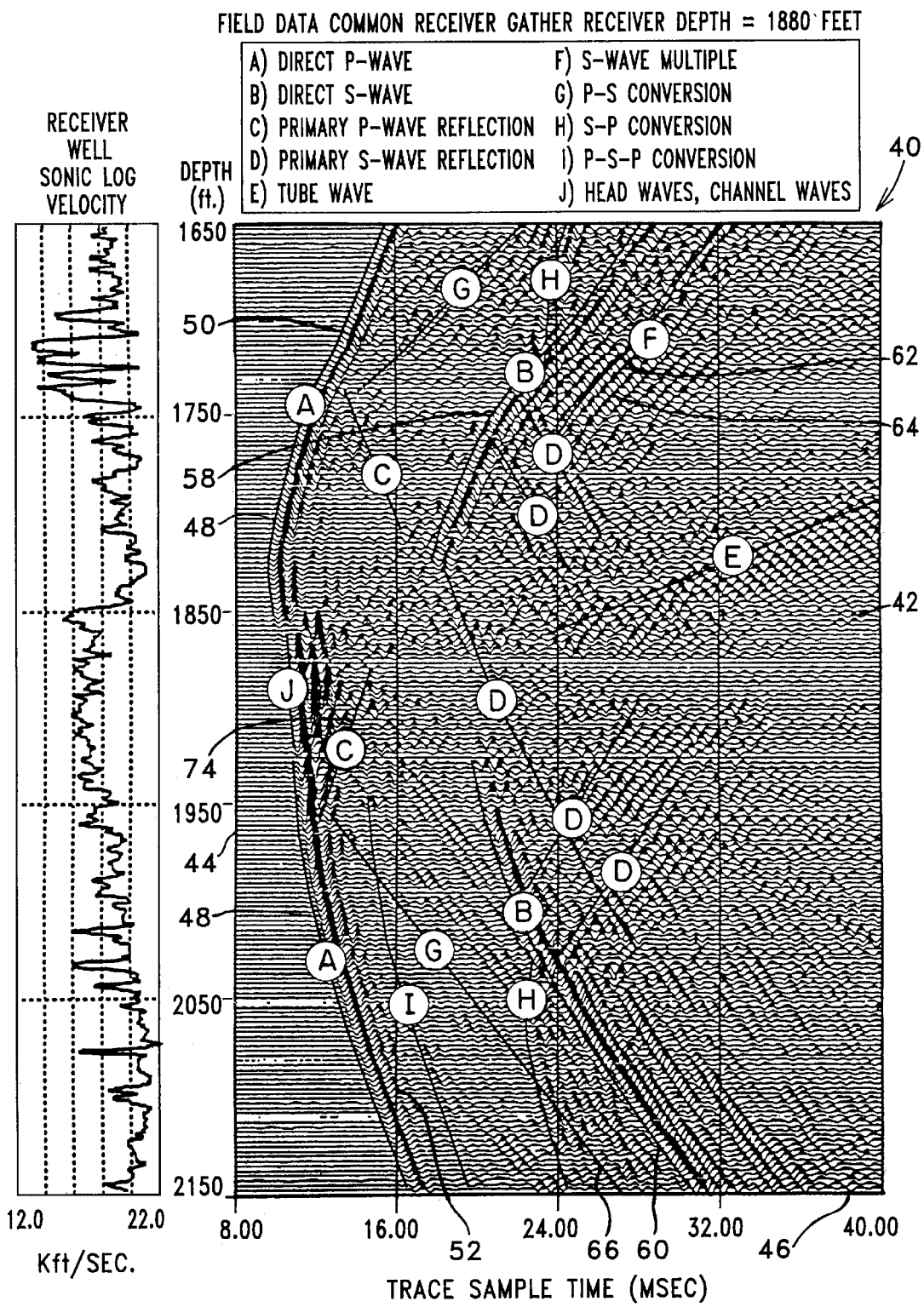
FIG. 2 is graphical representation showing a prior art common receiver gather produced using the seismic data obtained by the method shown in FIG. 1, shown here to illustrate various events present within the gather.
Figure 3:
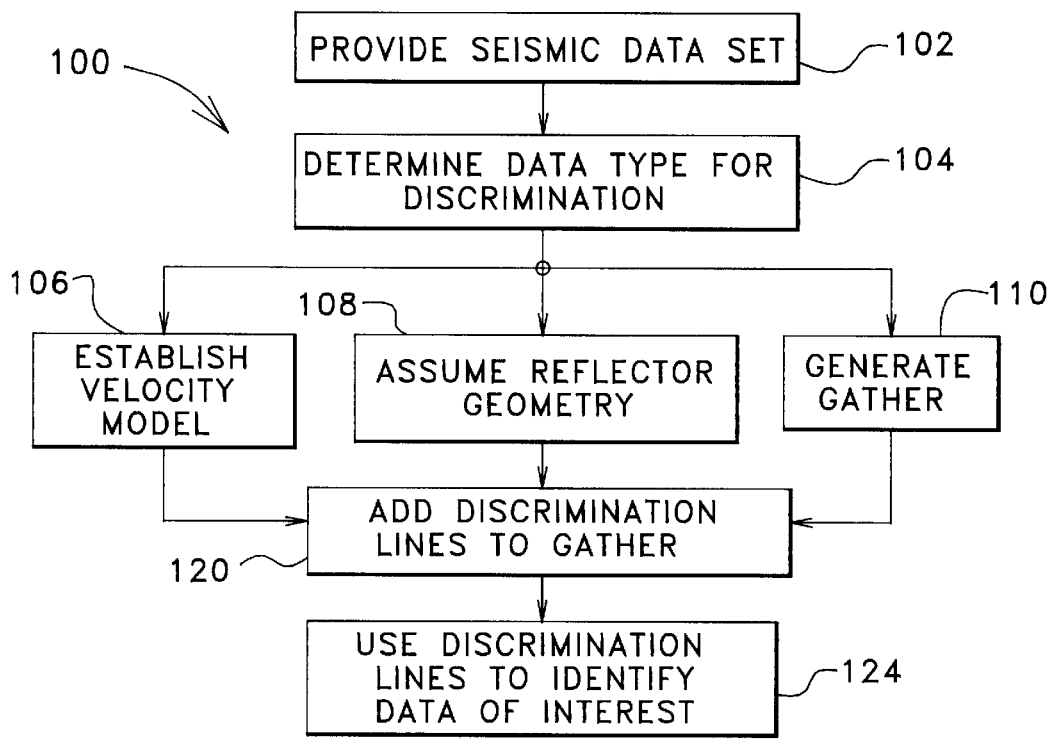
FIG. 3 is flow diagram illustrating the method of the present invention.

Attention is immediately directed to FIG. 3 which illustrates the method of the present invention generally indicated by the reference numeral 100. Method 100 begins with step 102 in which a seismic data set is provided, for example, by previously described system 10. In this regard, it is to be understood that while the method of the present invention is described as using seismic data which is produced in one particular way (i.e., by system 10), the present invention contemplates the use of seismic data produced by any other suitable system.

Continuing to refer to FIG. 3, method 100 continues at step 104 wherein a determination is made as to the type of data to be identified as a portion of (i.e., separated from) the overall seismic data record provided by system 10. The selected data type may comprise any suitable data type contained by the record such as, for example, compressional single reflection (p—p) data, shear single reflection (s—s) data or another data type, either mentioned or unmentioned. For illustrative purposes, the following discussions will assume the selection of p—p reflection data. It is to be understood, however, that one of skill in the art may readily adapt method 100 for use with other data types in view of the teachings herein.

After step 104, a number of steps including 106, 108 and 110 are performed in a parallel fashion. In step 106, an approximate velocity model of the region of interest is established. While this step may be performed using any number of suitable techniques which are available in the prior art, the above referenced U.S. patent application Ser. No. 08/820,855 discloses a highly advantageous node/layer model for use in developing a relatively accurate velocity model. For purposes of brevity, descriptions of the node/layer model disclosed therein will not be repeated here and the reader is referred to that application for specific details. In this regard, it is important to note that the accuracy of results which are obtained using method 100 are directly related to the accuracy of the velocity model which is developed in step 106 since it is used in a subsequent step.

In step 108, an assumed reflector geometry is established within the region of interest. A number of techniques are available in the prior art for performing step 108 including a technique which is commonly referred to as "mapping to depth and stacking." The mapping to depth and stacking technique relies upon the multiplicity of data within the entire seismic data record to quite accurately establish the directional orientations including, for example, dips of the main strata boundaries or features within the region of interest. At the time of this writing, mapping to depth and stacking is considered as a preferred technique for use in step 108 even though other suitable techniques, either presently known or to be developed, may be employed. It is noted, however, that mapping to depth and stacking of the raw recorded seismic data, without the discrimination enhancement discussed herein, is inherently limited to such main feature capabilities and does not necessarily provide an accurate indication of the feature depths.

Figure 4A:
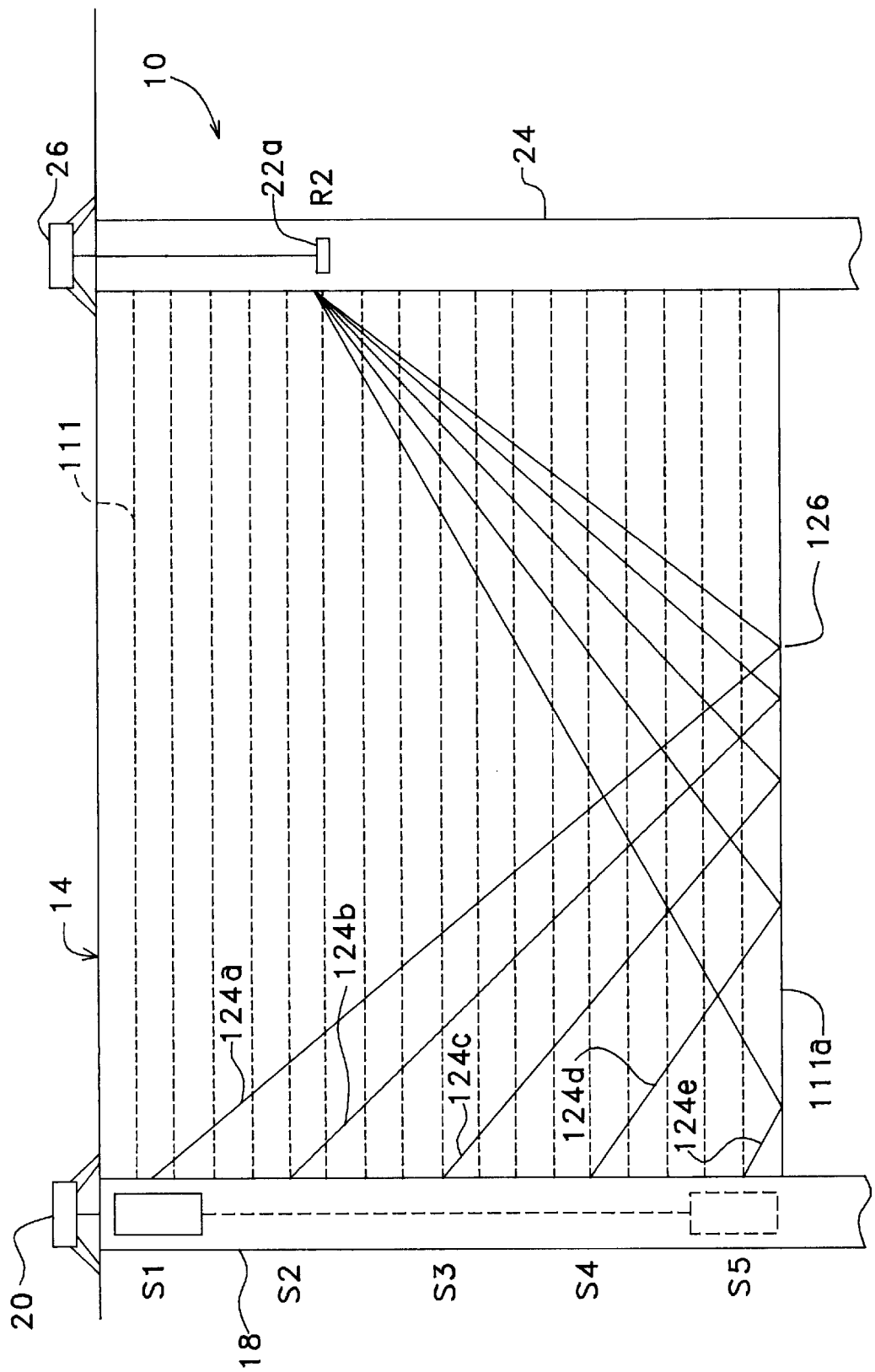
FIG. 4a is a diagrammatic illustration of a portion of the region originally shown in FIG. 1, shown here to illustrate a reflective boundary geometry for use in establishing discrimination lines, for example, by ray tracing, as part of the method of the present invention.

Referring to FIG. 4a and having gained a general, but accurate idea of the directional orientation of strata boundaries within the region of interest, step 108 can be completed by establishing the assumed reflector geometry. It is mentioned that certain components of previously described system 10 have been repeated in FIG. 4a. Therefore, like reference numbers have been applied whenever possible. Furthermore, only a small portion of region 14, immediately adjacent the surface of the ground is shown which includes exemplary source positions S1 through S5 in relation to a receiver position R2 at which measurements may be made, for example, by previously described receiver 22a. These source and receiver positions have been selected for illustrative purposes only, as will become evident with continuing discussions. Generally, the assumed reflector geometry is set up as a series of parallel boundaries 111 which themselves are uniformly spaced and parallel with the main feature boundaries (not shown) established by mapping to depth and stacking. This step is somewhat arbitrary to the extent that the boundary spacing is not particularly critical. Like the velocity model formulated in step 106, the accuracy of the assumed reflector boundaries in relation to the actual strata boundaries establishes, at least in part, the accuracy of the overall results which may be obtained by the present invention.

Figure 4B:
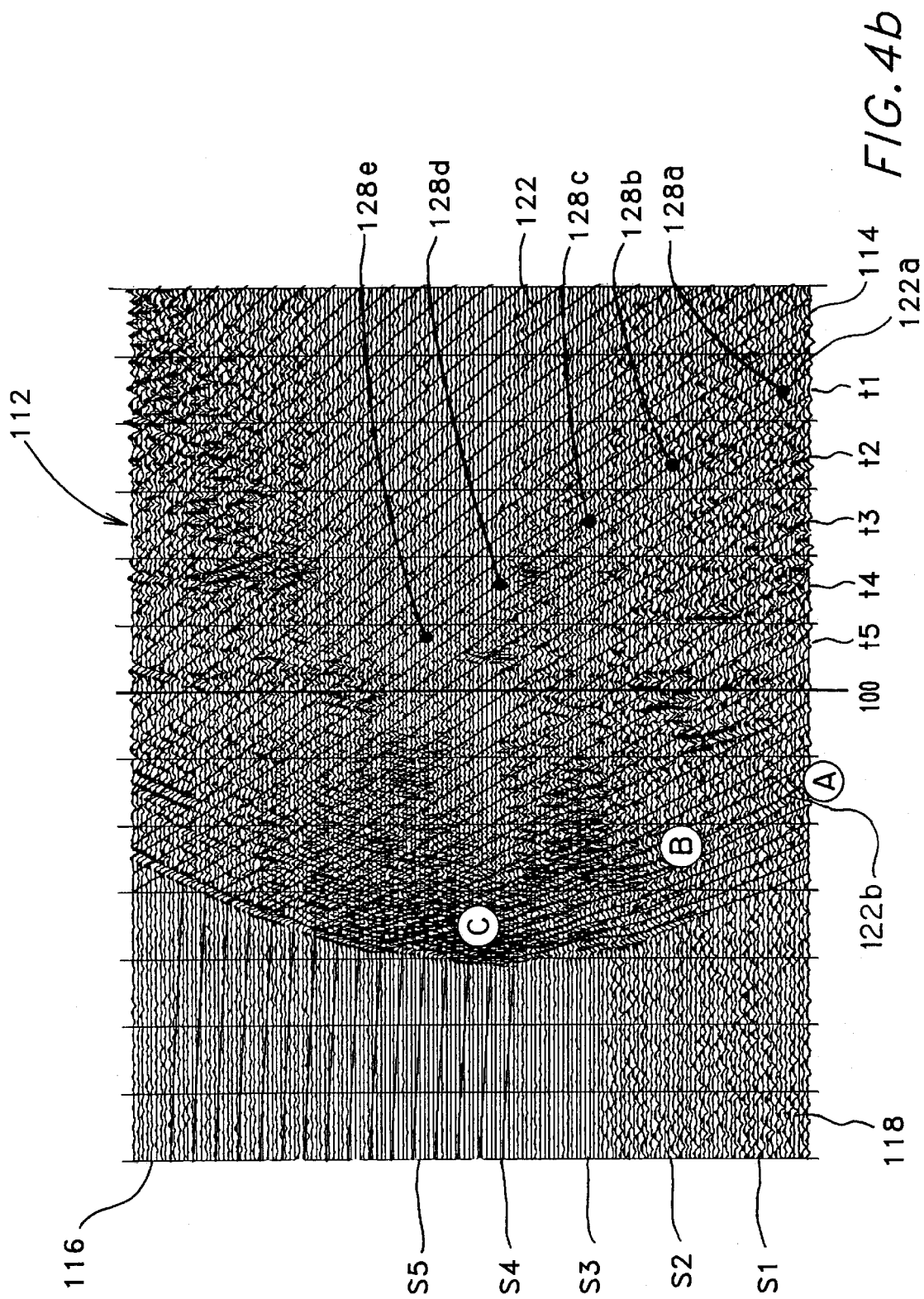
FIG. 4b is graphical representation showing another prior art common receiver gather produced using the seismic data obtained by the method shown in FIG. 1, shown here to further illustrate the incorporation of discrimination lines in accordance with the method of the present invention.

Turning now to FIG. 4b in conjunction with FIGS. 3 and 4a, in step 110, a gather of a predetermined type is produced for use in the remaining steps of the method. In the present example, a common receiver gather 112 is used. Gather 112 is similar to previously described gather 40 including a horizontally extending time axis 114 indicating traveltimes along its length, a vertically extending source depth axis 116 and a plurality of pressure wave plots or traces 118. As will be described at an appropriate point below, certain aspects of method 100 are highly advantageously when used with other gather types. Discussion of these aspects is deferred, however, until such time that this initial discussion, which provides a basic understanding of method 100, is completed. Moreover, the present discussion serves to illustrate the broad applicability of the method of the present invention by using the well known common receiver gather when, in fact, the method may be used on any gather type.

At step 120 and in accordance with the present invention, a highly advantageous and heretofore unseen family of discrimination lines 122 (see FIG. 4b) is incorporated into gather 112. Discrimination lines 122 graphically represent the locations of assumed reflector boundaries 111 (see FIG. 4a) from step 108. The locations and directional orientations of the discrimination lines are developed using a ray tracing step in which p—p rays are traced through the approximate velocity model of step 106 using the assumed reflector geometry of step 108. As an example, FIG. 4a shows one assumed boundary 111a as a solid line. For the benefit of the reader, the construction of a particular discrimination line 122a in gather 112 corresponding to boundary 111a will be described in graphical terms immediately hereinafter During ray tracing, a ray 124a is identified between S1 and R2. It should be appreciated that a traveltime t1 is associated with ray 124a and that the ray reflects at a particular point 126 on the assumed boundary. Turning to gather 112, a point 128a, which forms one point in the overall locus of points along discrimination line 122a, is plotted at t1 and for the source depth of S1, since the receiver depth is constant in this instance. Subsequently, rays 124b–e are identified, which originate from source positions S2–S5 and which have corresponding traveltimes t2–t5, respectively. Points 128b–e along discrimination line 122a are then plotted in a similar manner. While points 128 appear as extending along only a portion of discrimination line 112a, it should be appreciated that ray tracing establishes an overall locus of points 128 which locate discrimination line 122a.

It is to be understood that the foregoing description represents only one way in which the discrimination lines may be incorporated in the gather by one of skill in the art. It is further to be understood that any suitable technique may be used for this purpose and that the invention disclosed herein resides first in the recognition that such lines may be incorporated into the gather and, second, in the recognition that such lines are useful in the specific application of data discrimination/enhancement, as will be seen immediately below. Moreover, the assumed boundaries may be set up in other ways while remaining within the scope of the present invention provided only that some known relationship may be established between the data being identified and the discrimination lines.

Still referring to FIGS. 3 and 4b, it will be appreciated that, since the assumed reflector geometry is generally parallel with the actual strata boundaries from mapping to depth and stacking step 108 and since discrimination lines 122 are developed from the assumed geometry using p—p rays in the aforedescribed ray tracing step, actual reflection events which are present throughout gather 112 are substantially parallel to an adjacent one of the discrimination lines. As an example, a reflection event is present in gather 112 which runs generally along a discrimination line 122b from point A to point B. In step 124, such parallel reflection events are identified/enhanced throughout gather 112. Various techniques are available in the prior art for enhancing these parallel reflection events such as, for example, ray tracing.

While the graphical representation of FIG. 4b is a useful technique and provides the reader with an understanding of the fundamental concepts relating to the use of the discrimination lines of the present invention, it should be understood that this graphical representation serves primarily as an interpretive tool since, due to the shear size of the seismic data record, the method of the present invention is typically executed in a high speed processing environment which manipulates the seismic data in a digital format. Unfortunately, however, the separation of the reflection data in this environment is adversely complicated by a particular characteristic of discrimination lines 122 which can best be understood based upon the appearance of the discrimination lines in common receiver gather 112 or, for that matter, in any common receiver gather. More specifically, discrimination lines 122 are not parallel throughout gather 112. This non-parallel characteristic is particularly evident in an area C in FIG. 4. Moreover, it is also worthy of note that, even in instances where the assumed reflector geometry in step 108 includes parallel, uniformly spaced boundaries throughout the region of interest, the discrimination lines will continue to display non-parallelism, as described. While the discrimination process may be carried forth irrespective of non-parallelism exhibited by the discrimination lines in the graphical representation of FIG. 4b by simply comparing a particular event such as the one between points A and B with the nearest discrimination line, a certain degree of inaccuracy may be introduced since valid events residing midway between adjacent discrimination lines may, in fact, not be parallel with either line (i.e., these valid events may have a different slope than either discrimination line). As a graphical solution, valid events so disposed could be permitted to have a slope ranging between the slopes of the adjacent discrimination lines, thereby introducing the aforementioned inaccuracy. As another graphical solution, the slope of each event positioned between discrimination lines could be checked by constructing a discrimination line at the event's specific location, however, such an approach is burdensome. From the standpoint of the contemplated high speed processing environment, however, a more accurate solution may be employed which involves a mathematical process in which the discrimination lines are moved in a way which causes them to be parallel with one another, as will be described immediately hereinafter.

In view of the foregoing discussion, one of skill in the art will appreciate that event enhancement using high speed processing is best facilitated by parallelization of the discrimination lines. Once parallelization has been accomplished, events which are parallel to the discrimination lines can readily be enhanced with a high degree of accuracy using known techniques such as, for example, trace averaging, median calculation or F-K filtering. Fortunately, techniques exist which permit the discrimination lines to be moved into a true parallel relationship with one another so as to simplify the discrimination task, as will be described.

Figures 5, 6:
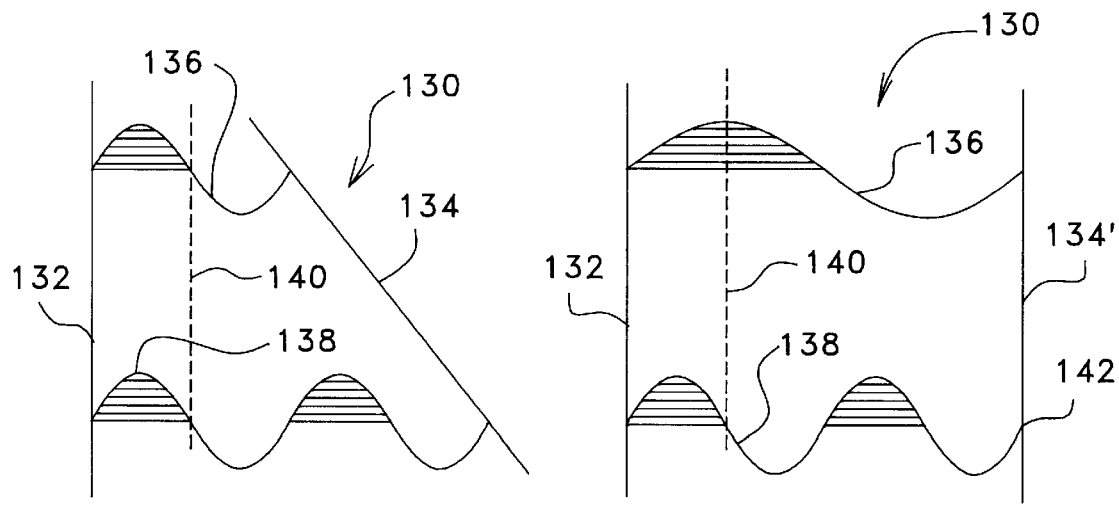
FIG. 5 is graphical representation illustrating a portion of a hypothetical gather having two traces along with frequency characteristics of the traces in relation to the discrimination lines of the present invention.
FIG. 6 is graphical representation illustrating a corresponding portion of the hypothetical gather of FIG. 5 following a transform which parallelizes the discrimination lines, shown here to illustrate a frequency distortion effect on one of the traces.

Turning now to FIG. 5, a small portion of a hypothetical gather 130 is illustrated which includes adjacent discrimination lines 132 and 134 in an exemplary orientation. Gather 130 further includes exemplary traces 136 and 138 extending between the discrimination lines. It is readily apparent in the figure that discrimination lines 132 and 134 are skewed with respect to one another to a degree which would not be seen in an actual gather. As will become evident, the skewed relationship of discrimination lines 132 and 134 has been exaggerated for purposes of illustrating a particular problem which is encountered in the transformation process of parallelizing the discrimination lines. In this regard, one technique, which is popular in the prior art, discriminates against noise by averaging adjacent traces within the gather. For example, the average value of traces 136 and 138 along a line 140, which runs in a direction perpendicular to the direction of the traces, is equal to zero since both of the traces are at their zero crossings along line 140. Generally, in actual applications, several adjacent traces (not shown) are commonly averaged in a similar manner. The resulting "average trace" (not shown) then replaces the middle trace of the several adjacent traces. Thus, noise and other perturbations in the gather are reduced. While applicants have discovered significant advantages regarding the use of discrimination lines, further discoveries have been made with regard to using discrimination lines in processes such as this averaging technique and with regard to the aforementioned problem which further improves upon the already highly advantageous method of the present invention, as will be described in detail immediately hereinafter.

Continuing with a description of FIG. 5, traces 136 and 138 are shown as continuous sinusoidal waveforms of the same frequency such that trace 136 includes one complete cycle while trace 138 includes two complete cycles. It is known in the art that in actual gathers, such as previously described gathers 40 and 112, the fundamental frequency which makes up each trace is somewhat constant while the traces vary primarily in amplitude. For this reason, exemplary traces 136 and 138 of FIG. 5, in being shown as continuous sinusoids, mirror one of the most important aspects of typical traces and, thus, serve as a useful representation for graphically interpreting the influence of discrimination line parallelization on traces 136 and 138. It should be understood that the following discussion describes only one exemplary method for parallelizing the discrimination lines and is not intended to encompass the wide range of different ways in which this process may be carried forth by one of skill in the art.

Turning to FIG. 6, discrimination line 134 of FIG. 5 has been replaced with a discrimination line 134' which is parallel to discrimination line 132. Essentially, a transform is performed which rotates the original discrimination line 134 about a point 142 in order to bring about the desired parallel relationship. Once the transform has been completed, the actual discrimination process is performed using the now parallel discrimination lines to enhance parallel events. Thereafter, an inverse transform (i.e., moving the discrimination lines back to their initial positions) is performed so as to recover data associated with the identified events. Unfortunately, however, the effect of the transform is a readily apparent stretching or distortion in the frequency of trace 136, as can be seen by direct comparison with FIG. 5. In fact, for the particular example shown, the frequency of trace 136 in FIG. 6 appears to be one-half of its actual value. While this example is exaggerated, it should be appreciated that the frequency distortion problem, without some sort of compensation, introduces significantly increasing levels of error in areas of increasingly non-parallel discrimination lines in a way which may compromise the integrity of the events which may be identified in the simple manner suggested above. The frequency distortion problem is further evidenced by observing that the average value of traces 136 and 138 along line 140 in FIG. 5 is zero while the average value along the same line in FIG. 6 is one-half of the value either trace. In seismic data enhancement applications contemplated by the present invention, relatively small frequency distortion and associated errors may significantly degrade overall results. As will be disclosed hereinafter, certain discoveries have been made which resolve the frequency distortion problem such that the benefits of the discrimination line approach described above can be maximized.

Figure 7:
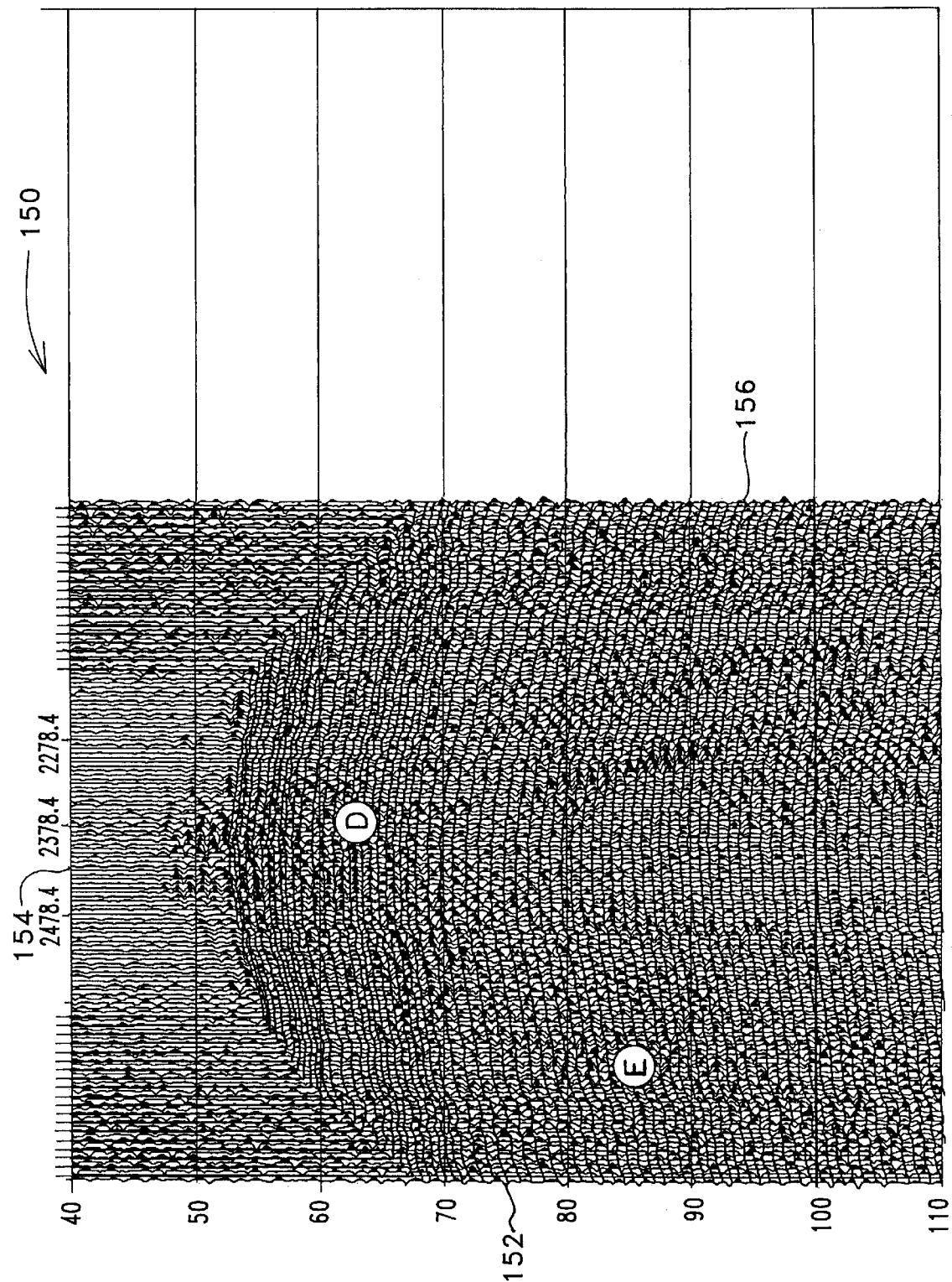
FIG. 7 is graphical representation illustrating a Common Mid-Depth gather produced using seismic data obtained by the method shown in FIG. 1, shown here to further illustrate the incorporation of generally parallel discrimination lines in accordance with the method of the present invention.

Attention is now directed to FIG. 7, which illustrates another type of gather generally indicated by the reference numeral 150 commonly referred to in the art as a Common Mid-Depth (hereinafter CMD) gather. Since all gathers include previously described features such as, for example, a time axis 152 and a depth axis 154, details regarding these features will not be repeated for purposes of brevity and the reader is referred to preceding descriptions. CMD gather 150, like all previously described gathers, is made up of a collection of traces 152 with each trace being recorded between a particular source position (source depth) and a particular receiver position (receiver depth). In this instance, however, traces 152 are selected such that the average of the source depth and receiver depth for any particular trace results in a constant, hence common average depth. For example, if the CMD is 100 feet, one trace may have a source depth of 50 feet and a receiver depth of 150 feet while another trace may have a source depth of 75 feet and a receiver depth of 125 feet, etc.

In accordance with the present invention, a plurality of discrimination lines 156 have been added to gather 150 using previously described method 100 with an assumed reflector geometry similar to the one which produced discrimination lines 122 of FIG. 4. Remarkably, it can be seen that discrimination lines 156 are generally parallel throughout gather 150. That is, while discrimination lines 156 do exhibit changes in their directional orientation in the gather, they remain generally parallel. In fact, the appearance of gather 150 is almost identical following parallelization and, therefore, a parallelized representation has not been provided. This recognition, in and by itself, is highly advantageous and substantially resolves the frequency distortion problem described above, as compared with using the discrimination lines of the present invention in a common receiver or common source gather (see, for example, FIG. 4). In this regard, the reader will recall that the frequency distortion effect caused by non-parallel discrimination lines is graphically illustrated by FIGS. 5 and 6. It is worthy of mention that, in the past, the CMD gather was thought by many of skill in the art to be of little utility beyond the mere display of data. The present invention, in contrast, recognizes that the use of the CMD gather in conjunction with the discrimination lines taught herein is invaluable in event enhancement applications. Thus, parallelization of discrimination lines 156 through a data transform permits precise enhancement of seismic data events which are parallel (or in some other predetermined orientation) with the discrimination lines using aforementioned techniques such as, for example, trace averaging, median calculation or F-K filtering, as are known in the art. That is, following parallelization, the slope of a valid event which resides between two adjacent discrimination lines need not fall within an acceptable range, but will have a slope very close to that of the discrimination lines themselves. In gather 150, valid parallel seismic data events are identified to the immediate left of points E and F. Interestingly, each of these events is substantially centered on a respective discrimination line. Once the events of interest have been located, they are moved back to their correct times by inverse transform. With the use of the CMD gather, the transform/inverse transform process is accompanied by a minimal and acceptable level of frequency distortion in the recovered data. It should be mentioned that FIG. 7 represents only one of many CMD gathers which may be generated using a particular seismic data record. In fact, it is quite possible that, without the use of enhancement techniques, it may appear that no reflection events are present in certain gathers. As will be seen immediately hereinafter, the present invention may be applied in an iterative fashion using a plurality of gathers in a way which contemplates seismic event enhancement having an accuracy which has not been seen heretofore.

Figure 8:
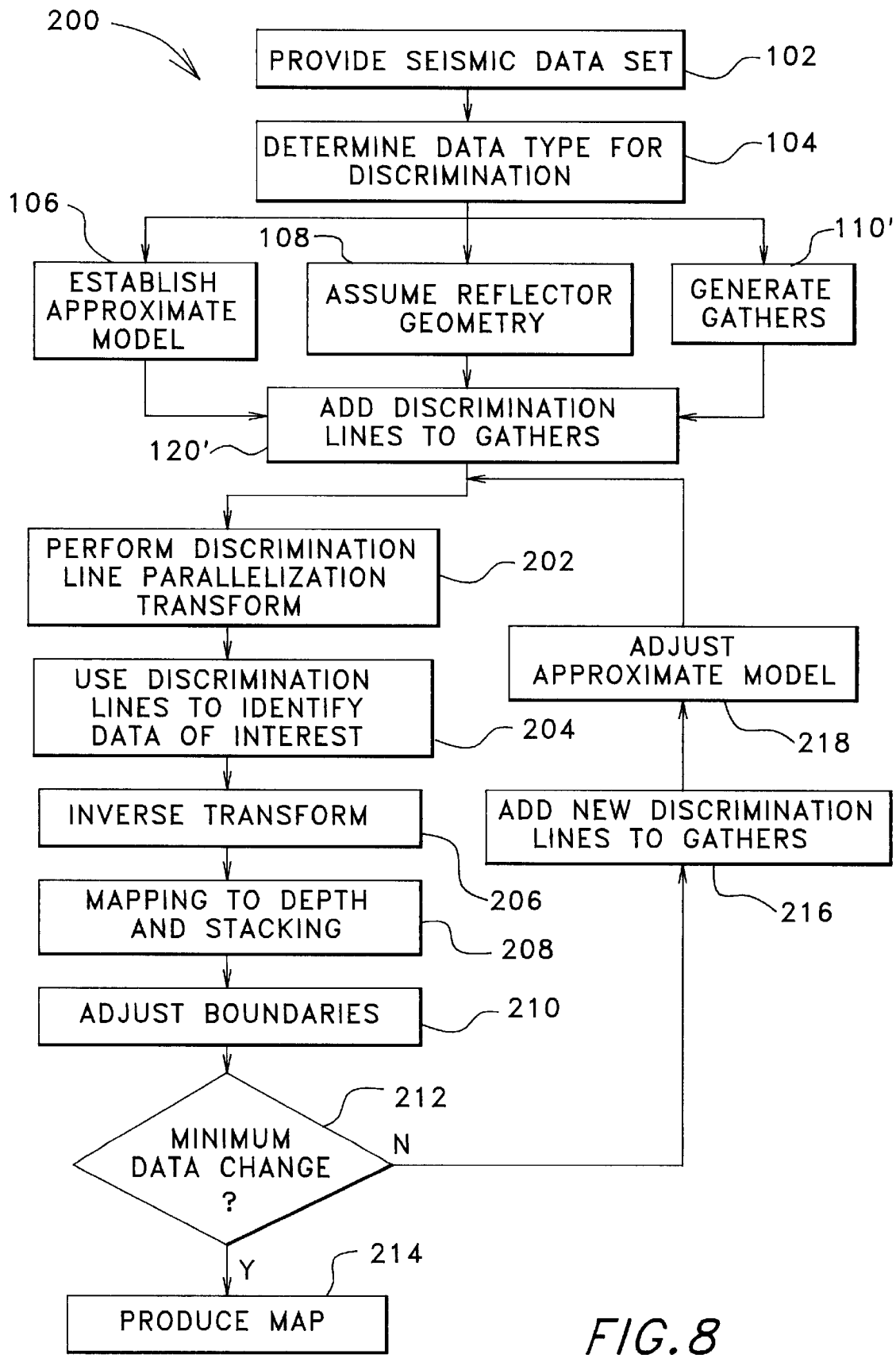
FIG. 8 is flow diagram illustrating the method of the present invention as part of an overall seismic imaging method.

Turning to FIG. 8, a seismic mapping method in accordance with the present invention is generally indicated by the reference numeral 200. Method 200 employs an iterative approach which incorporates steps of previously described method 100 up to and including step 120. Therefore, like reference numbers have been applied to these steps and the reader is referred to their previously appearing descriptions. It is noted, however, that steps 110' and 120' differ slightly from steps 110 and 120 to the extent that step 108' generates a plurality of gathers, for instance, all of the CMD gathers which can be produced from a particular seismic data record, while step 120' adds discrimination lines to all of the generated gathers, as previously described. From step 202 on, however, various new features and features only briefly mentioned above are incorporated into method 200. Therefore, these steps will be described in detail immediately hereinafter. It should also be mentioned that method 200 will be described for use in separating p—p reflection data using a CMD gather such as gather 150 of FIG. 7 so that the full benefits of the invention are appreciated. However, it is to be understood that method 200 may be used with other gather types and for identifying events other than p—p reflection events such as, for example, s—s reflection events (with very limited modifications) and other data types (with minor modifications).

Referring to FIGS. 7 and 8, following incorporation of discrimination lines 156 into the gather at step 120', step 202 is performed in which the data is transformed such that the generally parallel discrimination lines are made parallel in each of the plurality of gathers generated by step 110'. At step 204, parallelized discrimination lines are used to locate parallel events within the gather, as described above. In this regard, certain techniques may be used such as, for example, the aforedescribed trace averaging technique so as to enhance event data within individual gathers. At step 206, an inverse transform is performed on the data which makes up the enhanced parallel events so as to return these events to their correct times. Once again, it should be emphasized that method 200 is highly advantageous, in the first instance, simply due to the use of discrimination lines 156 and, in the second instance, since frequency distortion introduced by the discrimination lines in the CMD gather is essentially of no concern in either transform step 202 or inverse transform step 206 because the discrimination lines are generally parallel initially.

Continuing with step 208, enhanced event data obtained from each one of the gathers is used in conventional mapping to depth and stacking so as to generate a stacked image of the subsurface region of interest in a known manner. Ultimately, the stacked image will accurately represent the structure of the region.

In step 210, the reflection boundaries/geometries are adjusted based upon the enhanced reflection event data as contained by the stacked image. This adjustment is performed in a manner which is familiar to one of skill in the art such that the adjusted boundaries more accurately define the actual strata boundaries within the region of interest. At step 212, a determination is made as to the amount of change in the enhanced data which makes up the stacked image, as compared with the previous iteration. Once the change in the data (i.e., the change in the stacked image) is below a predetermined threshold, step 214 is performed wherein a substantially accurate map of the subsurface region of interest is produced using the enhanced reflection data and the approximate model. However, if step 212 is not satisfied, step 216 is performed in which new discrimination lines are incorporated into the gathers based on the new reflection data provided by step 208 in the form of the stacked image. Thereafter, an optional step 218 may be performed in which the approximate model may be adjusted using any number of different techniques. One highly advantageous technique is shown in FIG. 4 of the above referenced U.S. patent application wherein its steps 196, 198, 200 and 213 cooperatively accomplish adjustment of the approximate model. Following step 216, step 202 and steps subsequent thereto are performed.

It should be appreciated that the concepts of the present invention, as used in the method taught herein, may be applied in a number of different ways by one of skill in the art. As one example, if the method of the present invention is applied in a region which includes two or more areas having strata boundaries oriented in distinctly different directions (for example, on different sides of a fault), a different set of discrimination lines may be applied in each area. Thereafter, the results from each area may be combined in order to formulate an overall evaluation of the region. Therefore, the present examples and methods are considered as illustrative and not restrictive, and the invention is not to be limited to the details given herein, but may be modified within the scope of the appended claims.

What is claimed is:

1. A method of enhancing a certain type of seismic event data with respect to an overall set of seismic event data which includes other, different types of seismic event data, all of said data being recorded for a particular subterranean region, said method comprising the steps of:
   a) generating a particular type of gather from said overall data such that the gather includes at least a portion of said certain seismic event data and at least a portion of said other data;
   b) incorporating into said gather a series of data discrimination lines at positions and directions which are established in said gather non-analytically in a predetermined way based, at least in part, on an approximate model of the particular subterranean region; and
   c) using said data discrimination lines, enhancing said certain type of seismic event data which is present in said gather with respect to the other data within the gather.

2. The method of claim 1 wherein said step of incorporating the discrimination lines in said predetermined way based, at least in part on said approximate model includes the steps of (i) producing the approximate model of said region using at least a portion of said overall data, (ii) assuming a particular boundary geometry for strata within said region and (iii) determining the positions of said discrimination lines using said approximate model and the assumed boundary locations.

3. The method of claim 2 wherein said step of assuming a particular boundary geometry includes the step of establishing the assumed boundaries in directions which are generally parallel with the directions of strata within said region such that said certain seismic event data corresponding to the strata within said gather is oriented generally parallel with the discrimination lines.

4. The method of claim 3 wherein said certain seismic event data is enhanced based upon a parallel relationship with a nearest one of said discrimination lines.

5. The method of claim 2 wherein said step of determining the positions of said discrimination lines using said approximate model includes the steps of (i) incorporating the assumed boundary positions into the approximate model to establish a new approximate model and (ii) ray tracing through the new approximate model to determine the positions of the discrimination lines within said gather.

6. The method of claim 1 wherein said gather is a common mid-depth gather such that said discrimination lines approach a parallel relationship with one another.

7. The method of claim 1 wherein said certain seismic event data is single reflection compressional data and wherein the particular gather is selected as a common mid-depth gather.

8. The method of claim 1 wherein said step of enhancing said certain type of data using said discrimination lines includes the step of enhancing single reflection compressional data.

9. The method of claim 1 wherein said step of enhancing said certain type of data using said discrimination lines includes the step of enhancing single reflection shear data.

10. In a system for establishing a map of the value of a particular characteristic of a subterranean region of ground between two generally vertically extending boreholes from which a set of seismic event data relating to said particular characteristic is generated, a method comprising the steps of:
   a) producing an approximate model of said region using at least one portion of said seismic event data set;
   b) generating a set of gathers from said overall data set such that the gathers include a particular type of said seismic event data as well as other types of said seismic event data;
   c) assuming a particular boundary geometry for strata within said region;
   d) incorporating into each gather a series of data discrimination lines at positions and directions which are established in each gather non-analytically in a predetermined way based, at least in part, on the approximate model of the subterranean region;
   e) enhancing a subset of seismic event data from the overall set of gathers based upon a specific directional orientation of the subset with respect to the discrimination lines; and
   f) adjusting the assumed boundary geometry based upon the enhanced data subset for use in establishing a more definitive map of said region.

11. The method of claim 10 wherein said step of establishing said discrimination lines using said approximate model includes the steps of (i) incorporating the assumed boundary positions into the approximate model to establish a modified approximate model and (ii) ray tracing through the modified approximate model to non-analytically determine the positions of the discrimination lines within said gather.

12. The method of claim 10 wherein said discrimination lines in their established positions are non-parallel with respect to one another.

13. The method of claim 10 wherein before said step of using the discrimination lines to enhance said particular subset of seismic event data, performing a step of transforming the overall set of seismic event data in a way which causes the discrimination lines to be substantially parallel with one another.

14. The method of claim 10 wherein said data enhancing step enhances said particular subset of seismic event data based upon a specified relationship between said particular subset of seismic event data and the established positions and directions of said discrimination lines.

15. The method of claim 14 wherein said particular subset is divisible into a plurality of event groups which are attributable to different seismic features and wherein said data enhancing step enhances each event group based upon (i) a substantially parallel directional relationship between each event group and (ii) the positional relationship of each event group with a nearest one of said discrimination lines.

16. The method of claim 8 wherein said subset of seismic event data is single reflection compressional data and wherein the selected gathers are common mid-depth gathers.

17. The method of claim 8 wherein said step of enhancing said subset of seismic event data using said discrimination lines includes the step of enhancing single reflection compressional data.

18. The method of claim 8 wherein said step of enhancing said subset of seismic event data using said discrimination lines includes the step of enhancing single reflection shear data.

19. A method of enhancing a certain type of seismic event data with respect to an overall set of seismic event data which includes other, different types of seismic event data, all of said data being recorded for a particular subterranean region, said method comprising the steps of:
   a) generating a particular type of gather from said overall data such that the gather includes at least a portion of said certain seismic event data and at least a portion of said other data;
   b) incorporating into said gather a series of data discrimination lines at positions and directions which are established in said gather in a predetermined way such that the discrimination lines, in their established positions, are represented non-analytically and are non-parallel with respect to one another; and
   c) using said data discrimination lines, enhancing said certain type of seismic event data which is present in said gather with respect to the other data within the gather.

20. A method of enhancing a certain type of seismic event data with respect to an overall set of seismic event data which includes other, different types of seismic event data, all of said data being recorded for a particular subterranean region, said method comprising the steps of:
   a) generating a particular type of gather from said overall data such that the gather includes at least a portion of said certain seismic event data and at least a portion of said other data;
   b) incorporating into said gather a series of data discrimination lines at positions and directions which are established in said gather non-analytically in a predetermined way based, at least in part, on an approximate model of the particular subterranean region; and
   c) using said data discrimination lines, enhancing said certain type of seismic event data which is present in said gather with respect to the other data within the gather based upon a specified relationship between the certain seismic event data and the established positions and directions of said discrimination lines.

21. In a system for establishing a map of the value of a particular characteristic of a subterranean region of ground between two generally vertically extending boreholes from which a set of seismic event data relating to said particular characteristic is generated, a method comprising the steps of:
   a) producing an approximate model of said region using at least one portion of said seismic event data set;
   b) generating a set of gathers from said overall data set such that the gathers include a particular subset of said seismic event data as well as other types of said seismic event data;
   c) assuming a particular boundary geometry for strata within said region;
   d) incorporating into each gather a series of data discrimination lines at positions and directions which are established in each gather non-analytically in a predetermined way based, at least in part, on an approximate model of the particular subterranean region;
   e) enhancing the particular subset of seismic event data from the overall set of gathers based upon a specific directional orientation of the subset with respect to the discrimination lines; and
   f) adjusting the assumed boundary geometry based upon the enhanced particular data subset for use in establishing a more definitive map of said region;
   g) incorporating in each gather a new series of data discrimination lines at new positions and directions which are established in each gather non-analytically in said predetermined way using said approximate model and the adjusted assumed boundary geometry; and
   h) using said new discrimination lines and said approximate model, enhancing a more definitive particular subset of said seismic event data with respect to the overall set of seismic event data based upon said specific directional orientation of the new data subset with respect to the new discrimination lines and, thereafter, readjusting the boundary geometry based upon the more definitive subset of seismic event data for use in reestablishing a still more definitive map of said region.

22. In a system for establishing a map of the value of a particular characteristic of a subterranean region of ground between two generally vertically extending boreholes from which a set of seismic event data relating to said particular characteristic is generated, a method comprising the steps of:
   a) producing an approximate model of said region using at least one portion of said seismic event data set;
   b) generating a set of gathers from said overall data set such that the gathers include a particular subset of said seismic event data as well as other types of said seismic event data;
   c) assuming a particular boundary geometry for strata within said region such that the assumed boundaries are established in directions which are generally parallel with the directions of strata within said region;
   d) incorporating into each gather a series of data discrimination lines at positions and directions which are established in each gather non-analytically in a predetermined way which, based on the generally parallel relationship of the assumed boundaries with the directions of strata, causes said particular subset of seismic event data corresponding to the strata within said gather to be oriented generally parallel with the discrimination lines;

e) enhancing said particular subset of seismic event data from the overall set of gathers based upon the generally parallel directional orientation of the particular subset with respect to the discrimination lines; and f) adjusting the assumed boundary geometry based upon the enhanced particular data subset for use in establishing a more definitive map of said region.

23. In a system for establishing a map of the value of a particular characteristic of a subterranean region of ground between two generally vertically extending boreholes from which a set of seismic event data relating to said particular characteristic is generated, a method comprising the steps of:

a) producing an approximate model of said region using at least one portion of said seismic event data set;

b) selecting a particular type of gather from a group of different types of gathers such that the discrimination lines in the selected gather most nearly approach a parallel relationship with respect to one another as compared with the appearance of the discrimination lines in any other type of gather, and, thereafter, generating a set of gathers of the selected particular type from the overall seismic event data set such that the set of gathers includes a particular subset of said seismic event data as well as other types of said seismic event data;

c) assuming a particular boundary geometry for strata within said region;

d) incorporating into each gather a series of data discrimination lines at positions and directions which are established in each gather non-analytically in a predetermined way;

e) enhancing the particular subset of seismic event data from the overall set of gathers based upon a specific directional orientation of the particular subset with respect to the discrimination lines; and f) adjusting the assumed boundary geometry based upon the enhanced particular data subset for use in establishing a more definitive map of said region.

24. The method of claim 5 wherein said seismic data is borehole data.

25. The method of claim 11 wherein said seismic data is borehole data.

26. The method of claim 19 wherein before said step of using the discrimination lines to enhance said data, performing a step of transforming the overall set of seismic event data in a way which causes the discrimination lines to be substantially parallel with one another.

27. The method of claim 20 wherein said data enhancing step enhances said certain seismic event data based upon a substantially parallel relationship of the data with a nearest one of said discrimination lines.

28. The method of claim 21 including the step of repeating steps (g) through (h) in an iterative manner until such time that the enhanced more definitive particular subset of said seismic event data changes by less than a predetermined amount as compared with the previous iteration.

29. The method of claim 22 wherein said particular subset of seismic event data is enhanced based upon a parallel relationship with a nearest one of said discrimination lines.

30. The method of claim 23 wherein said selected gathers are common mid-depth gathers such that said discrimination lines approach a parallel relationship with one another.

* * * * *

UNITED STATES PATENT AND TRADEMARK OFFICE
CERTIFICATE OF CORRECTION

PATENT NO : 6,014,342
DATED : January 11, 2000
INVENTOR(S): Spyridon K. Lazaratos It is certified that error appears in the above-identified patent and that said Letters Patent are hereby corrected as shown below:

[63] Please correct Continuation-in-part of application No. 08/820,855.

Replace with --08/820,885--

Signed and Sealed this

Seventeenth Day of April, 2001

Attest:

NICHOLAS P. GODICI

Attesting Officer     *Acting Director of the United States Patent and Trademark Office*